(12) United States Patent  (10) Patent No.: US 8,405,911 B2
Uematsu et al.  (45) Date of Patent: Mar. 26, 2013

(54) IN-VEHICLE INFORMATION DISPLAY APPARATUS

(75) Inventors: Hiroshi Uematsu, Wako (JP); Yuya Kishimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1162 days.

(21) Appl. No.: 12/273,909

(22) Filed: Nov. 19, 2008

(65) Prior Publication Data

US 2009/0135092 A1    May 28, 2009

(30) Foreign Application Priority Data

Nov. 20, 2007  (JP) ................................. 2007-300961

(51) Int. Cl.
  *G02B 27/14*  (2006.01)
(52) U.S. Cl. ........................................ 359/630; 359/631
(58) Field of Classification Search .......... 359/630–632; 345/7, 8
See application file for complete search history.

(56) References Cited

U.S. PATENT DOCUMENTS 6,100,990 A * 8/2000 Ladewski ...................... 356/445
2010/0066925 A1 * 3/2010 Nagahara et al. ............... 349/11

FOREIGN PATENT DOCUMENTS

| JP | 05-085222 | 4/1993 |
| JP | 05-273493 | 10/1993 |
| JP | 2006-008089 | 1/2006 |

* cited by examiner

*Primary Examiner* — James Jones
(74) *Attorney, Agent, or Firm* — Rankin, Hill & Clark LLP (57) ABSTRACT

An in-vehicle information display apparatus including a virtual image generator that projects a virtual image on a windshield of a vehicle. The virtual image generator projects the virtual image on a windshield in at least one of the following projection modes: a first projection mode and a second projection mode. In the first projection mode, the virtual image is projected on the windshield in such a way that the virtual image gradually becomes darker from bottom to top. In the second projection mode, the virtual image is projected on the windshield in such a way that the virtual image gradually becomes more lightly grayed from bottom to top.

7 Claims, 10 Drawing Sheets

IN-VEHICLE INFORMATION DISPLAY APPARATUS

FIELD OF THE INVENTION

The present invention relates to an in-vehicle information display apparatus that projects a virtual image containing a variety of types of information on a windshield of a vehicle to notify a driver of the information.

BACKGROUND OF THE INVENTION

A vehicle is equipped with a variety of notification apparatuses for notifying a driver of a variety of types of information on driving. In recent years, in particular, studies have been undertaken to develop technologies for displaying a variety of types of information on a windshield. Display technologies using a projected virtual image or using a pattern have been known, one example of which is disclosed in Japanese Patent Application Laid-Open Publication No. 2006-8089 (JP 2006-8089 A).

In the in-vehicle information display apparatus disclosed in JP 2006-8089 A, a pattern containing information is provided on a windshield. The pattern is provided on the windshield by being printed or engraved on the glass or by a film being inserted in the glass. The information expressed in the pattern includes a substantially trapezoidal picture drawn along a driving lane, and helps the driver to travel straight forward. The driver can readily drive the vehicle straight forward by maneuvering the vehicle in such a way that the trapezoidal pattern always follows the driving lane viewed from a passenger compartment through the windshield.

The in-vehicle information display apparatus described above, however, only relates to a technology in which a trapezoidal pattern is simply provided on the windshield. The driver is only able to visually recognize the pattern as a flat displayed object. To visually notify the driver of information in a more appropriate, quicker manner, it is preferable to enhance the visibility of the pattern.

Further, when the driver is driving a vehicle while looking at a distant scene from the passenger compartment through the windshield, the driver's eyes focus on a point far away from the windshield. In this case, the pattern provided on the windshield is also within the sight of the driver. The portion of the pattern within the periphery of the sight is, however, multiplied due to binocular parallax of the driver in some cases, which is then visually superimposed in the horizontal direction. The driver feels uncomfortable with the thus displayed pattern. To visually notify the driver of information in a quicker and more appropriate manner, it is preferable to eliminate the uncomfortable feeling with the displayed pattern and enhance the visibility of the pattern.

The above discussion holds true for a method for displaying a virtual image containing information on a windshield.

SUMMARY OF THE INVENTION

An object of the invention is to provide a display technology for projecting a virtual image containing information on a windshield and allowing a driver to be visually notified of the information in an appropriate, quick manner.

According to an aspect of the invention, there is provided an in-vehicle information display apparatus including a virtual image generator capable of projecting a virtual image on a windshield of a vehicle. The virtual image generator is configured to project the virtual image in at least one of the following projection modes: a first projection mode in which the virtual image is projected in such a way that a lower portion thereof is bright and the brightness is gradually lowered from the lower portion to an upper portion, and a second projection mode in which the virtual image is projected in such a way that the lower portion is heavily grayed and the grayscale gradually becomes lighter from the lower portion to the upper portion.

In the invention, as described above, the virtual image is displayed on the windshield in such a way that the lower portion, which corresponds to the nearer side in the traveling direction of the vehicle, is bright and the brightness is gradually lowered from the lower portion to an upper portion, or the lower portion is heavily grayed and the grayscale gradually becomes lighter from the lower portion to an upper portion. The driver can therefore visually recognize the virtual image three-dimensionally. Since the sense of three-dimensionality and the sense of depth (the sense of distance) of the virtual image are thus enhanced, the visibility of the virtual image is improved. As a result, the driver is visually notified of information in a more appropriate, quicker manner.

The virtual image generator preferably displays the virtual image on the windshield in such a way that, when the virtual image is projected on a forward road surface separated by a predetermined distance from a view point position of the driver who is driving the vehicle, the projected virtual image is visually recognized to have a projected width that is equivalent to the width (L3) of the vehicle. The driver can therefore visually recognize the projected width (vehicle width) relative to the distance between driving lane lines. Therefore, when the driver pulls the vehicle over to a side of the road (pulls the vehicle over to the curb), the visibility of the virtual image is improved, whereby the driver can readily pull the vehicle over to the curb.

The virtual image generator preferably displays the virtual image on the windshield in such a way that, when the virtual image is projected on the forward road surface separated by a predetermined distance from the perspective of the driver who is driving the vehicle, projected ends of the virtual image are visually recognized to be substantially parallel to the driving lane lines of the road. Since the projected ends of the virtual image can be visually recognized to be substantially parallel to the driving lane lines of the road, the driver will not feel uncomfortable with or troubled about the displayed virtual image.

According to another aspect of the invention, there is provided an in-vehicle information display apparatus including a virtual image generator capable of projecting a virtual image on a windshield of a vehicle. The virtual image generator is configured to project the virtual image in at least one of the following projection modes: a first projection mode in which the virtual image is projected in such a way that widthwise ends of the virtual image are bright and the brightness gradually decreases from each of the widthwise ends toward a widthwise central portion, and a second projection mode in which the virtual image is projected in such a way that the widthwise ends are heavily grayed and the grayscale gradually becomes lighter from each of the widthwise ends toward the widthwise central portion.

In the aspect of the invention described above, when the eyes of the driver focus on a point far away from the windshield, it is possible to prevent the virtual image displayed on the windshield from overlapping in the horizontal direction due to binocular parallax, whereby the visibility of the virtual image is improved. Therefore, the driver does not feel uncomfortable with the displayed virtual image, and hence has no trouble with it. As a result, the driver is visually notified of information in a more appropriate, quicker manner.

According to yet another aspect of the invention, an in-vehicle information display apparatus including a virtual image generator capable of projecting one or more virtual images on a windshield of a vehicle is provided. The virtual image generator is configured to project the virtual images in at least one of the following projection modes: a first projection mode in which a virtual image in a position that corresponds to the nearer side in the traveling direction of the vehicle is projected as a bright image on the windshield, and a virtual image in a position farther away in the traveling direction is projected as a darker image; and a second projection mode in which a virtual image in a position that corresponds to the nearer side in the traveling direction of the vehicle is projected as a heavily grayed image on the windshield, and a virtual image in a position farther away in the traveling direction is projected as a more lightly grayed image.

In the invention described above, one or more virtual images are displayed on the windshield in such a way that a virtual image in a position that corresponds to the nearer side in the traveling direction of the vehicle is displayed as a bright image and a virtual image in a position farther away in the traveling direction is displayed as a darker image, or a virtual image in a position that corresponds to the nearer side in the traveling direction of the vehicle is displayed as a heavily grayed image and a virtual image in a position farther away in the traveling direction is displayed as a more lightly grayed image. The driver can therefore visually recognize the virtual images three-dimensionally. Since the sense of three-dimensionality and the sense of depth (the sense of distance) of the virtual images are thus enhanced, the visibility of the virtual image is improved. As a result, the driver is visually notified of information in a more appropriate, quicker manner.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

First, an in-vehicle information display apparatus of a first embodiment will be described with reference to FIGS. 1 to 4.

Figure 1:
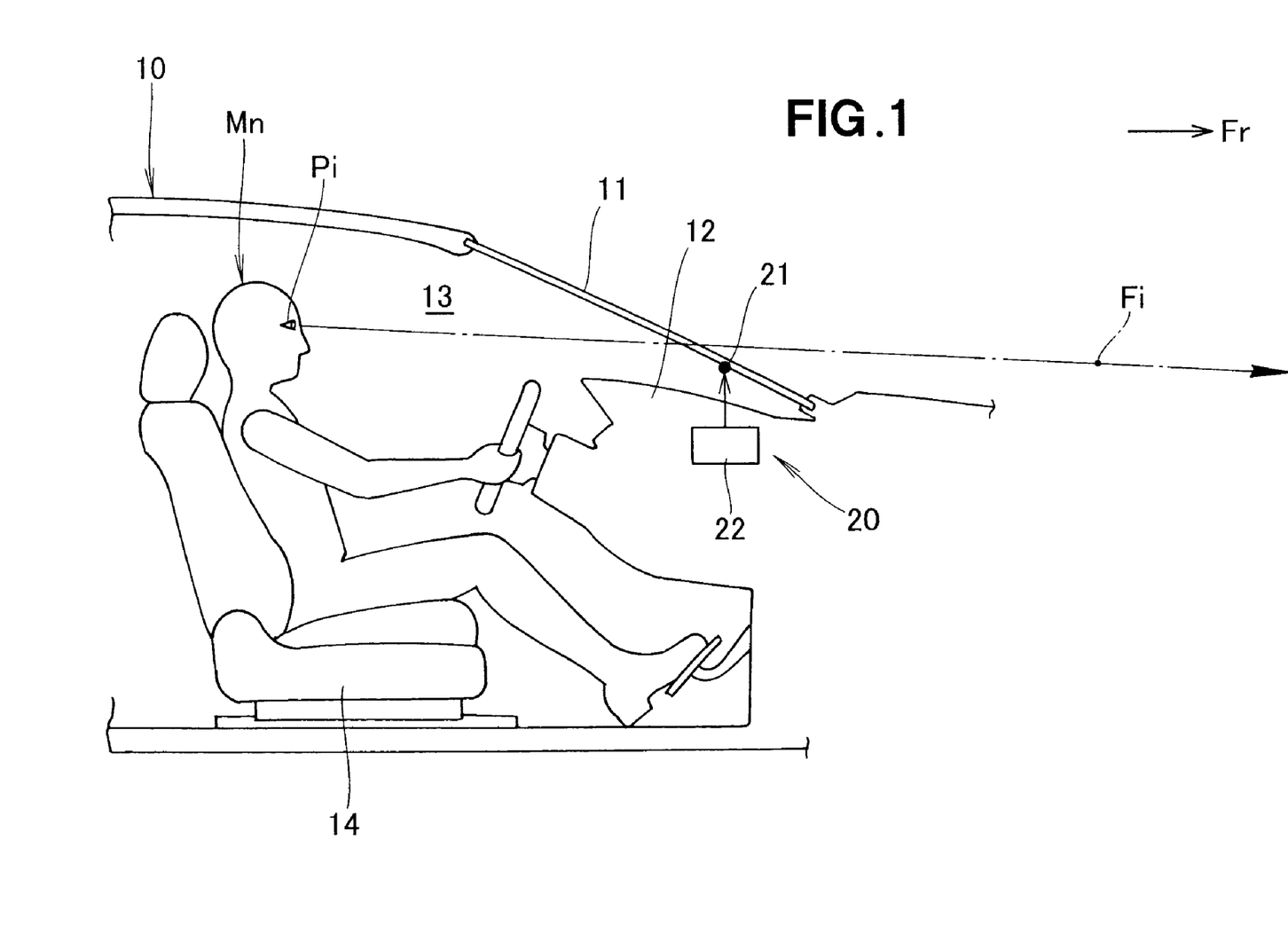
FIG. 1 is a schematic side elevational view showing a vehicle employing an in-vehicle information display apparatus according to a first embodiment of the present invention.
Figure 2:
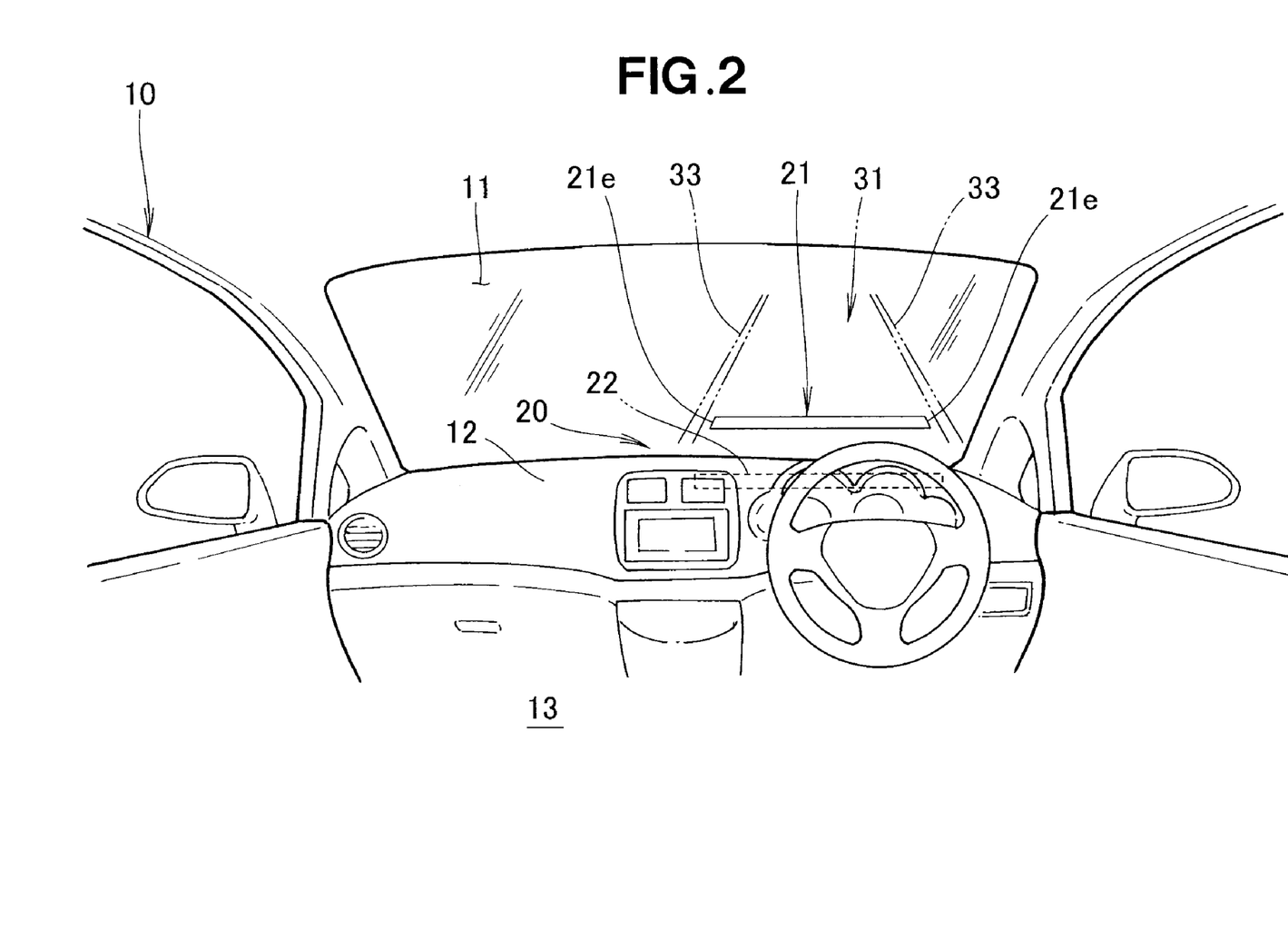
FIG. 2 is a schematic view showing a windshield of the vehicle of FIG. 1 as seen from a passenger compartment.

As shown in FIGS. 1 and 2, a vehicle 10 includes an in-vehicle information display apparatus 20 of the first embodiment. The in-vehicle information display apparatus 20 notifies a driver Mn of displayed information by projecting a virtual image 21 containing a variety of types of information on a windshield 11 of the vehicle 10. The in-vehicle information display apparatus 20 includes a virtual image generator 22.

The virtual image generator 22, which can project a predetermined virtual image 21 on the windshield 11, is disposed in a position where the virtual image generator 22 does not block the sight of the driver Mn, for example, in an instrument panel 12 under the windshield 11. Specifically, the virtual image generator 22 includes a head-up display (HUD) and projects the virtual image 21 in a lower portion of the windshield 11. The head-up display 22 is a combination of a display device (such as a liquid crystal display) that produces a display pattern representing the virtual image 21, a light source, and a plurality of mirrors.

When the light source illuminates the display pattern in the display device, the display pattern is outputted from the display device, reflected off the plurality of mirrors in a predetermined direction, and projected as the virtual image 21 on the windshield 11. As a result, the single virtual image 21 is projected and superimposed on a forward scene viewed from a passenger compartment 13 through the windshield 11. The driver Mn seated on a seat 14 can visually recognize the virtual image 21 projected on the windshield 11 while driving the vehicle and viewing a scene in the forward direction Fr (in the traveling direction Fr) from the passenger compartment 13 through the windshield 11, as indicated by the arrow Fi (see FIG. 1).

Figure 3:
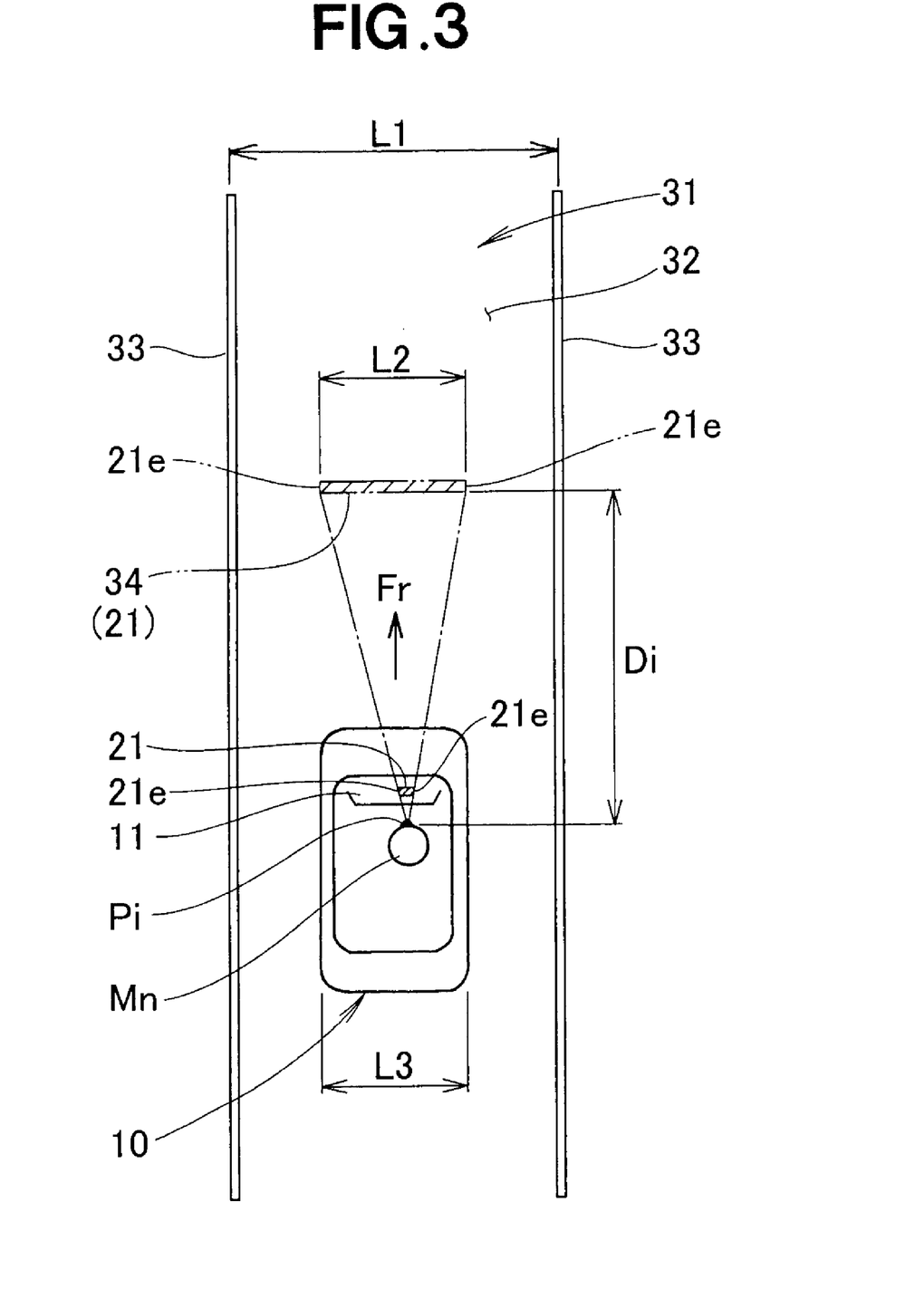
FIG. 3 is a schematic view showing a case where a virtual image displayed on the windshield of FIG. 1 is projected on a road surface.

As shown in FIGS. 2 and 3, the virtual image 21 projected on the windshield 11 is a horizontal band-shaped display image. The driver Mn sees the virtual image 21 superimposed on a forward scene viewed from the passenger compartment 13 through the windshield 11, that is, a road 31.

Figure 4:
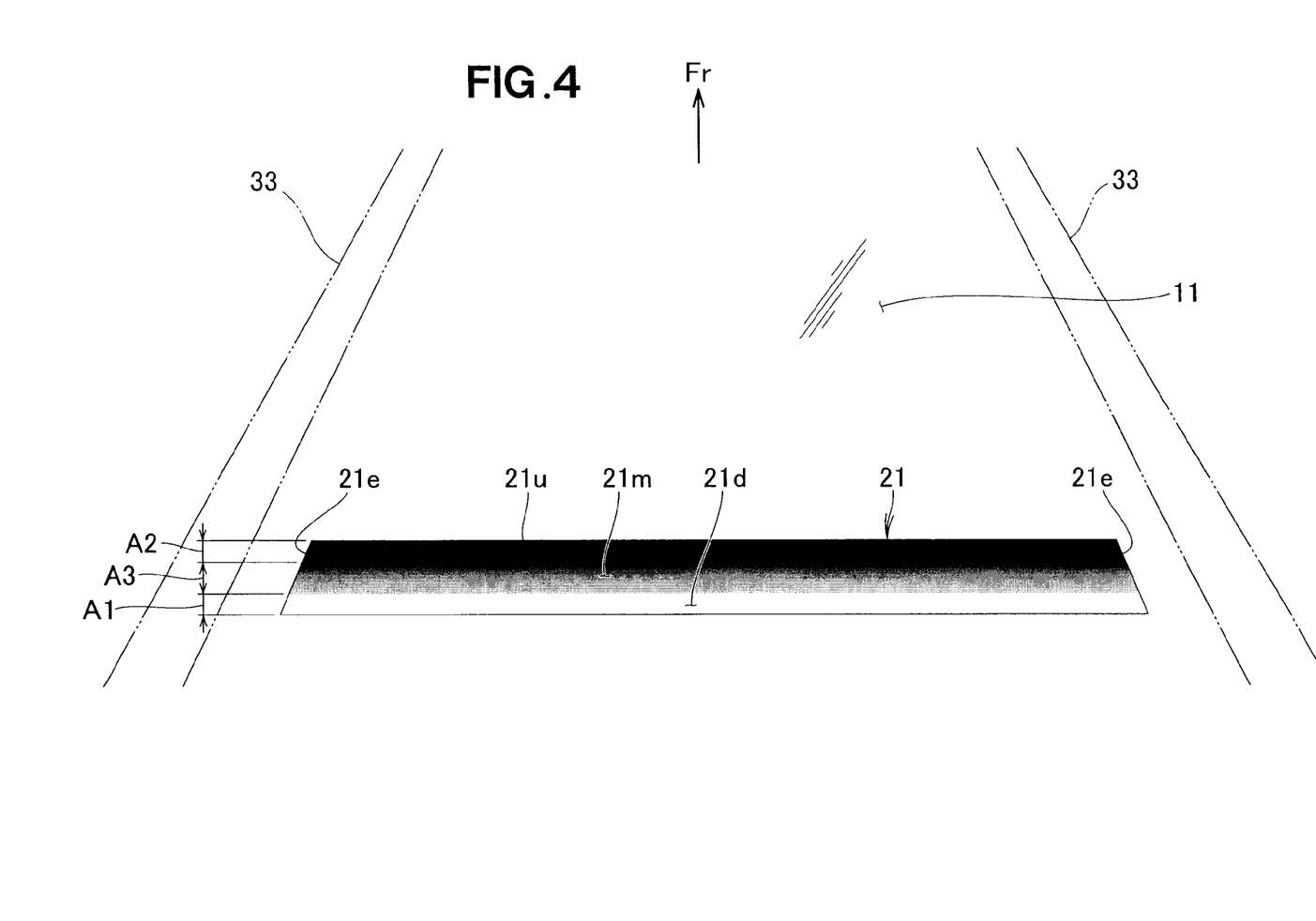
FIG. 4 is a schematic view showing a virtual image in the first embodiment, projected on the windshield of FIG. 2.

A case shall now be considered wherein the virtual image 21 displayed on the windshield 11 is then projected on a road surface 32 in the forward direction Fr, as shown in FIGS. 2 to 4. That is, the virtual image 21 is assumed to be projected on the road surface 32, the distance from which to a view point (eye) position Pi of the driver Mn who is driving the vehicle 10 being a predetermined distance Di. The virtual image 21 assumed to be projected on the forward road surface 32 through the windshield 11 is also referred to as a "road-surface-projected virtual image 34" as appropriate.

When the virtual image 21 projected on the windshield 11 is visually superimposed on the forward road 31 viewed from the passenger compartment 13 through the windshield 11, the driver Mn perceives that he is visually recognizing the road-surface-projected virtual image 34.

The distance Di from the view point position Pi of the driver Mn through the virtual image 21 to the road surface 32 is significantly greater than the distance from the view point position Pi to the windshield 11. The virtual image 21 displayed on the windshield 11 can thus be considered to be enlarged and projected on the road surface 32. The road-surface-projected virtual image 34 projected on the road 20 surface 32 is significantly larger than the virtual image 21 displayed on the windshield 11. L1 is the distance between left and right driving lane lines 33, 33 on the road. The width L2 of the road-surface-projected virtual image 34 projected in the horizontal direction corresponds to the width L3 of the vehicle 10 and is smaller than the distance L1 between the driving lane lines 33, 33.

The virtual image generator 22 thus displays a virtual image on the windshield 11 in such a way that, when the virtual image 21 is, like the road-surface-projected virtual image 34, projected on the forward road surface 32 separated from the view point position Pi of the driver Mn by the predetermined distance Di, the road-surface-projected virtual image 34 is visually recognized to have the projected width L2 that is equivalent to the vehicle width L3.

The driver Mn can therefore visually recognize the projected width L2 (vehicle width L3) relative to the distance L1 between the driving lane lines 33, 33. Therefore, when the driver Mn pulls the vehicle 10 over to a side of the road 31 (pulls the vehicle 10 over to the curb), the visibility of the virtual image is improved, whereby the driver Mn can readily pull the vehicle over to the curb.

Further, the virtual image generator 22 (see FIG. 2) displays a virtual image on the windshield 11 in such a way that, when the virtual image 21 is projected on the forward road surface 32 separated from the view point position Pi of the driver Mn by the predetermined distance Di, left and right projected ends 21e, 21e (both ends 21e, 21e in the vehicle width direction) of the virtual image 21 are visually recognized to be substantially parallel to the left and right driving lane lines 33, 33, as shown in FIGS. 3 and 4. Since the projected ends 21e, 21e of the virtual image 21 can be visually recognized to be substantially parallel to the left and right driving lane lines 33, 33, the driver Mn will not feel uncomfortable with or bothered about the displayed virtual image 21.

As apparent from the above description, the left and right projected ends 21e, 21e of the virtual image 21 correspond to information on the width of the vehicle 10. That is, the virtual image 21 contains information on the width of the vehicle 10. The height of the virtual image 21 projected on the windshield 11 is set in such a way that, when the driver Mn looks at the virtual image 21 from the passenger compartment 13, the virtual image 21 is visually positioned at the front end of the vehicle 10 (the front end of a hood, for example).

The driver Mn (see FIG. 1) can readily drive the vehicle 10 by maneuvering the vehicle 10 in such a way that the left and right projected ends 21e, 21e always follow the left and right driving lane lines 33, 33 visible from the passenger compartment 13 through the windshield 11. For example, when the driver Mn drives the vehicle 10 straight forward on the road 31, maneuvers the vehicle 10 through a narrow road, or pulls the vehicle 10 over to the curb, the driver Mn can readily drive the vehicle by using the virtual image 21 as guidance.

With respect to the virtual image 21 projected on the windshield 11 as viewed from the passenger compartment 13, a lower end area 21d shown in FIG. 4 shall be referred to as a lower portion 21d, an upper end area 21u shall be referred to as an upper portion 21u, and an area 21m between the lower portion 21d and the upper portion 21u shall be referred to as an intermediate portion 21m. The sizes of the lower portion 21d, the upper portion 21u, and the intermediate portion 21m are A1, A2, and A3, respectively.

The virtual image generator 22 is configured to project the virtual image 21 in at least one of the following projection modes: a first projection mode M1 and a second projection mode M2 (not shown). In the first projection mode M1, the virtual image 21 is projected in such a way that the lower portion 21d is bright and the brightness is gradually lowered from the lower portion 21d toward the upper portion 21u. In the second projection mode M2, the virtual image 21 is projected in such a way that the lower portion 21d is heavily grayed and the grayscale gradually becomes lighter (paler) from the lower portion 21d toward the upper portion 21u.

As described above, the brightness or the grayscale of the virtual image 21 is graded from the lower portion 21d toward the upper portion 21u. For example, in the first projection mode M1, the intermediate portion 21m gradually becomes darker from bottom to top, whereas in the second projection mode M2, the intermediate portion 21m gradually becomes lighter from bottom to top.

The virtual image 21 is displayed on the windshield 11 in such a way that the lower portion 21d, which corresponds to the nearer side in the traveling direction Fr of the vehicle 10, is bright and the brightness is gradually lowered from the lower portion 21d toward the upper portion 21u, or the lower portion 21d is heavily grayed and the grayscale gradually becomes lighter from the lower portion 21d toward the upper portion 21u. For example, the lower portion 21d is displayed in bright white, the intermediate portion 21m is displayed in white that gradually becomes darker from bottom to top, and the upper portion 21u is displayed in dark white.

The driver Mn can visually recognize the lower portion 21d displayed in bright white more distinctly than a forward scene viewed from the passenger compartment 13 through the windshield 11. On the other hand, the intermediate portion 21m becomes gradually less visible from bottom to top, and the upper portion 21u displayed in dark white is hardly visible (or not visible). The driver Mn can therefore visually recognize the virtual image 21 three-dimensionally. Since the sense of three-dimensionality and the sense of depth (the sense of distance) of the virtual image 21 are thus enhanced, the visibility of the virtual image is improved. As a result, the driver Mn is visually notified of information in a more appropriate, quicker manner.

Figure 5:
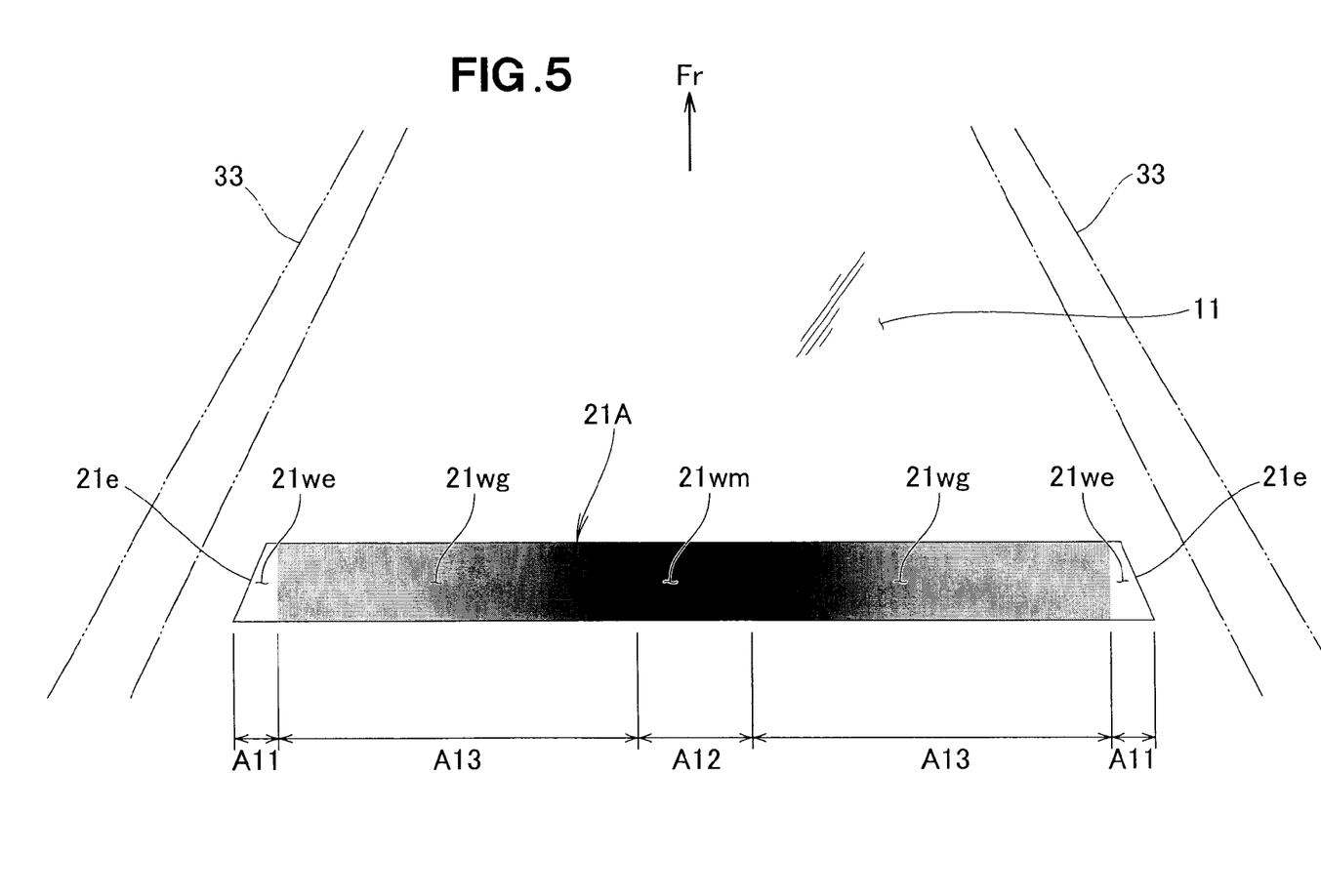
FIG. 5 shows a first modification of the virtual image projected on the windshield of FIG. 2.
Figure 6:
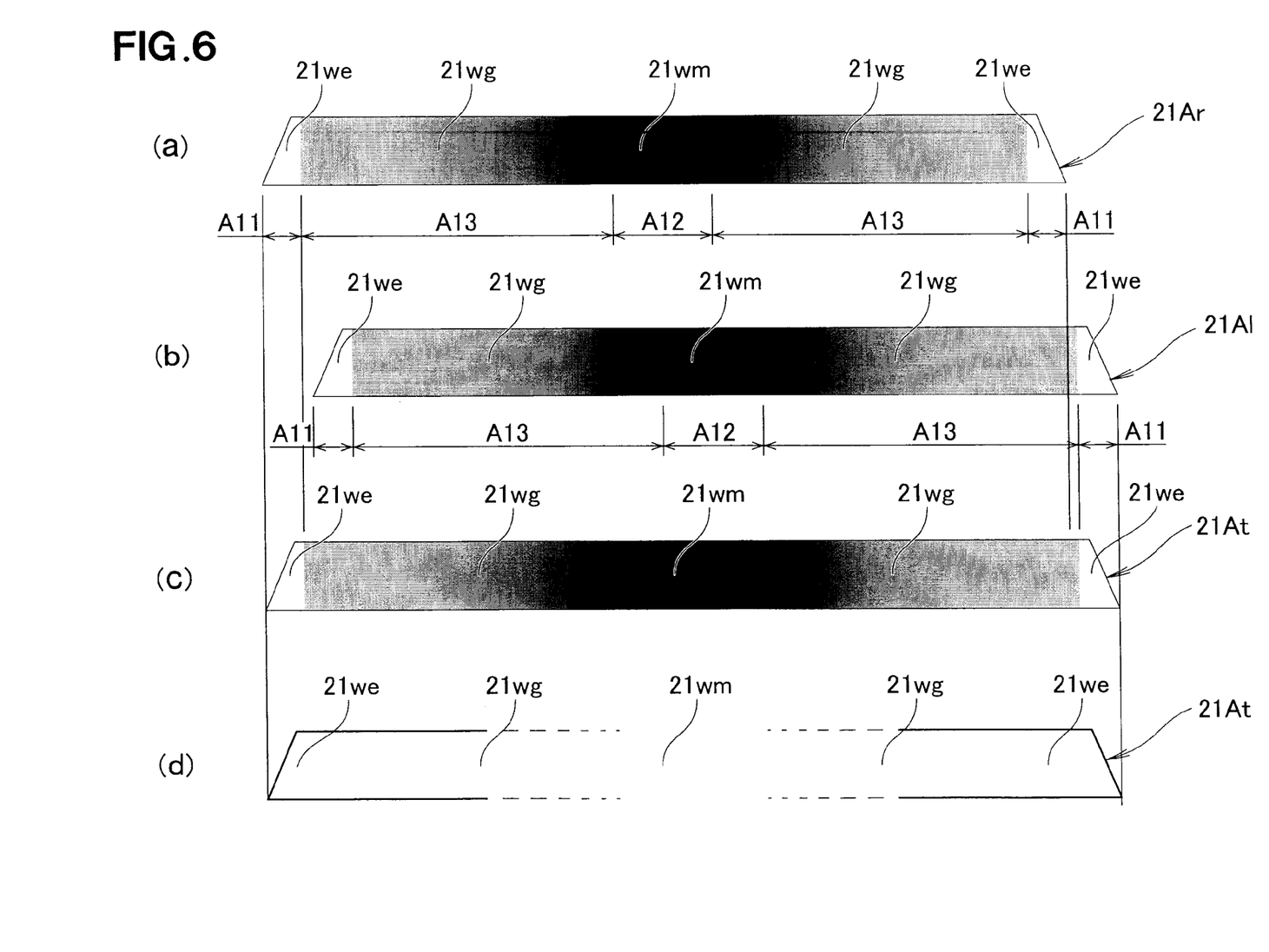
FIGS. 6(a) to (d) show how the virtual image of FIG. 5 looks.

FIGS. 5 and 6 show a first modification of the virtual image in the first embodiment. The same components as those of the vehicle 10 and the in-vehicle information display apparatus 20 shown in FIGS. 1 to 4 have the same reference characters, and no description will be made of such components.

An in-vehicle information display apparatus 20 of the first modification (see FIGS. 1 and 2) has the same basic configuration as that in the first embodiment. A virtual image 21A projected from the virtual image generator 22 of the first modification on the windshield 11 is therefore a single horizontal band-shaped display image, as shown in FIG. 5. That is, the virtual image 21A of the first modification has substantially the same shape as that of the virtual image 21 in the first embodiment shown in FIG. 4. The driver Mn sees the virtual image 21A superimposed on a forward scene viewed from the passenger compartment 13 through the windshield 11, that is, the road 31. The first modification, however, differs from the first embodiment in terms of the following points.

Now, look at the virtual image 21A projected on the windshield 11 from the passenger compartment 13, and let areas 21we, 21we at both ends (left and right ends) in the width direction of the vehicle 10 be called widthwise ends 21we, 21we, a central area 21wm in the width direction be called a widthwise central portion 21wm, and an area 21wg between each of the widthwise ends 21we and the widthwise central portion 21wm be called an intermediate portion 21wg. The sizes of the widthwise end 21we, the widthwise central portion 21wm, and the intermediate portion 21wg are A11, A12, and A13, respectively.

The virtual image generator 22 of the first modification (see FIGS. 1 and 2) is configured to project the virtual image 21A shown in FIG. 5 in projection modes M11 and M12 (not shown) different from the projection modes in the first embodiment. That is, the virtual image generator 22 of the first modification is configured to project the virtual image 21A in at least one of the first and second projection modes M11 and M12. In the first projection mode M11, the virtual image 21A is projected in such a way that the widthwise ends 21we, 21we are bright and the brightness is gradually lowered from each of the widthwise ends 21we, 21we toward the widthwise central portion 21wm. In the second projection mode M12, the virtual image 21A is projected in such a way that the widthwise ends 21we, 21we are heavily grayed and the grayscale gradually becomes lighter from each of the widthwise ends 21we, 21we toward the widthwise central portion 21wm.

As described above, the brightness or the grayscale of the virtual image 21A is graded from each of the widthwise ends 21we, 21we toward the widthwise central portion 21wm. For example, in the first projection mode M11, the intermediate portion 21wg gradually becomes darker from the periphery toward the center in the width direction, whereas in the second projection mode M12, the intermediate portion 21wg gradually becomes lighter from the periphery toward the center in the width direction.

The virtual image 21A is displayed on the windshield 11 in such a way that the widthwise ends 21we, 21we are bright and the brightness is gradually lowered from each of the widthwise ends 21we, 21we toward the widthwise central portion 21wm, or the widthwise ends 21we, 21we are heavily grayed and the grayscale gradually becomes lighter from each of the widthwise ends 21we, 21we toward the widthwise central portion 21wm. For example, the widthwise ends 21we, 21we are displayed in bright white, the intermediate portion 21wg is displayed in white that gradually becomes darker from the periphery toward the center in the width direction, and the widthwise central portion 21wm is displayed in dark white.

The driver Mn can visually recognize the widthwise ends 21we, 21we displayed in bright white more distinctly than a forward scene viewed from the passenger compartment 13 through the windshield 11. On the other hand, the intermediate portion 21wg gradually becomes less visible from the end toward the center in the width direction, and the widthwise central portion 21wm displayed in dark white is hardly visible (or not visible). The driver Mn can therefore visually recognize the virtual image 21A three-dimensionally. Since the sense of three-dimensionality and the sense of depth (the sense of distance) of the virtual image 21A are thus enhanced, the visibility of the virtual image is improved. The driver Mn is visually notified of information in a more appropriate, quicker manner.

When the driver Mn is driving the vehicle while visually perceiving a distant scene from the passenger compartment 13 through the windshield 11, the eyes of the driver Mn focus on a point far away from the windshield 11. In this case, the virtual image 21A projected on the windshield 11 is also within the sight of the driver Mn. The portion of the virtual image 21A within the periphery of the sight is, however, multiplied due to the binocular parallax of the driver Mn in some cases, and is then visually superimposed in the horizontal direction. The driver Mn feels uncomfortable with the resulting displayed virtual image 21A.

In contrast, as described above, the virtual image 21A in the first modification gradually becomes darker from each of the widthwise ends 21we, 21we toward the widthwise central portion 21wm (including the virtual image 21A that gradually becomes more lightly grayed). A description will be made of how the virtual image 21A in the first modification looks to the driver Mn based on FIG. 6 and with reference to FIGS. 1 and 5. FIGS. 6(a) to 6(d) show how the virtual image shown in FIG. 5 looks.

As shown in FIG. 1, when the eyes of the driver Mn focus on a point far away from the windshield 11, the driver Mn sees the virtual image 21A displayed on the windshield 11 (see FIG. 5) as shown in FIGS. 6(a) to 6(c).

FIG. 6(a) shows an image 21Ar viewed only by the right eye of the driver Mn (right-eye-recognized image 21Ar).

FIG. 6(b) shows an image 21Al viewed only by the left eye of the driver Mn (left-eye-recognized image 21Al). The left-eye-recognized image 21Al looks as if it is slightly shifted (displaced) to the right relative to the right-eye-recognized image 21Ar due to binocular parallax. The amount of shift (the amount of displacement) in the horizontal direction is exaggerated so that the following description is readily understood.

FIG. 6(c) shows an image 21At viewed by both eyes of the driver Mn (binocularly recognized image 21At). The binocularly recognized image 21At is viewed when the right-eye-recognized image 21Ar shown in FIG. 6(a) and the left-eye-recognized image 21Al shown in FIG. 6(b) overlap each other in the horizontal direction.

The left-eye-recognized image 21Al (see FIG. 6(b)) does not overlap the left widthwise end 21we of the right-eye-recognized image 21Ar (see FIG. 6(a)). Similarly, the right-eye-recognized image 21Ar does not overlap the right widthwise end 21we of the left-eye-recognized image 21Al. Therefore, as shown in FIG. 6(c), since the left and right widthwise ends 21we, 21we in the binocularly recognized image 21At are visually bright (heavily grayed) and distinct, the driver Mn can visually recognize the ends as clear displayed information.

On the other hand, the right intermediate portion 21wg of the left-eye-recognized image 21Al overlaps the right widthwise end 21we of the right-eye-recognized image 21Ar. Therefore, since the right widthwise end 21we of the right-eye-recognized image 21Ar is visually dim and blurred, the driver Mn cannot visually recognize the end as clear displayed information.

Similarly, the left intermediate portion 21wg of the right-eye-recognized image 21Ar overlaps the left widthwise end 21we of the left-eye-recognized image 21Al. Therefore, since the left widthwise end 21we of the left-eye-recognized image 21Al is visually dim and blurred, the driver Mn cannot visually recognize the end as clear displayed information.

As a result, as shown in FIG. 6(c), the left and right intermediate portions 21wg, 21wg in the binocularly recognized image 21At gradually become darker (more lightly grayed) toward the widthwise central portion 21wm and hence are visually blurred. That is, it is possible to prevent the right-eye-recognized image 21Ar and the left-eye-recognized image 21Al from overlapping each other in the horizontal direction due to binocular parallax of the driver Mn.

Further, as shown in FIG. 6(c), the widthwise central portion 21wm in the binocularly recognized image 21At is hardly visible because it is dark (lightly grayed).

FIG. 6(d) diagrammatically shows how the binocularly recognized image 21At described above and shown in FIG. 6(c) looks. That is, when the eyes of the driver Mn focus on a point far away from the windshield 11, the driver Mn sees the virtual image 21A displayed on the windshield 11 (see FIG. 5) as shown in FIG. 6(d). In other words, when the eyes of the driver Mn focus on a point far away from the windshield 11, it is possible to prevent the virtual image 21A (see FIG. 5) displayed on the windshield 11 from overlapping in the horizontal direction due to binocular parallax, whereby the visibility of the virtual image 21A is improved. Therefore, the driver Mn does not feel uncomfortable with the displayed virtual image 21A, and hence is not bothered thereby. As a result, the driver Mn is visually notified of information in a more appropriate, quicker manner. Further, since the widthwise central portion 21wm, which is not required to be visually recognized as displayed information, is hardly visible because it is dark (lightly grayed), the driver Mn has no trouble with it.

Figure 7:
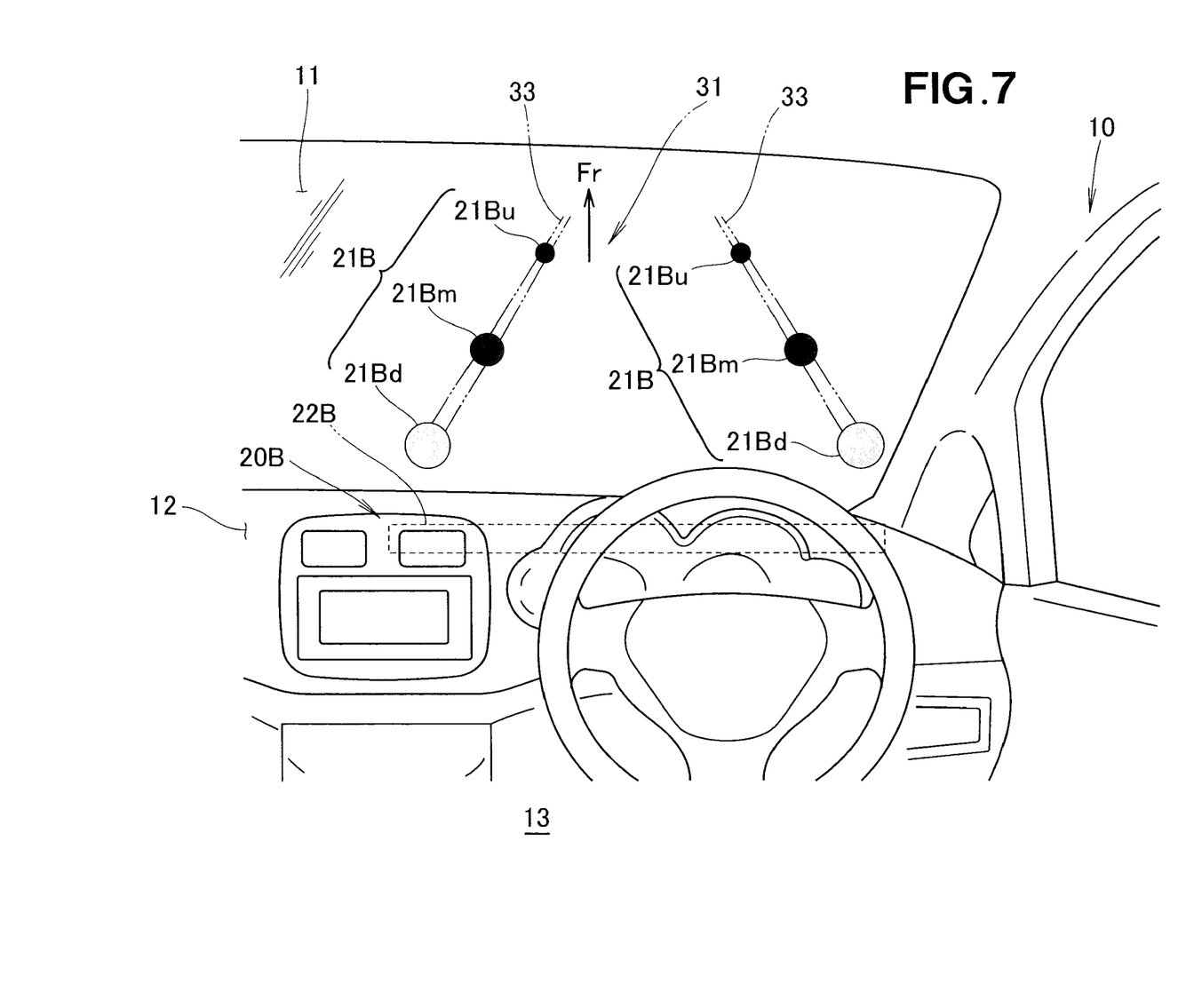
FIG. 7 shows a second modification of the virtual image projected on the windshield of FIG. 2.

FIG. 7 shows a second modification of the virtual image projected on the windshield shown in FIG. 2.

An in-vehicle information display apparatus 20B of the second modification has the same basic configuration as that of the in-vehicle information display apparatus 20 of the first embodiment. That is, a virtual image generator 22B of the second modification has the same basic configuration as that of the virtual image generator 22 of the first embodiment. The second modification, however, differs from the first embodiment in terms of the following points.

As shown in FIG. 7, the virtual image generator 22B of the second modification is configured to project a pair of left and right virtual images 21B, 21B on the windshield 11. The driver Mn (see FIG. 1) sees the virtual images 21B, 21B superimposed on a forward scene viewed from the passenger compartment 13 through the windshield 11, that is, the road 31. The left virtual image 21B is a group of a plurality of virtual images: a lower virtual image 21Bd displayed in the lowermost portion of the windshield 11, an upper virtual image 21Bu displayed in the uppermost portion, and an intermediate virtual image 21Bm displayed between the lower virtual image 21Bd and the upper virtual image 21Bu. The same argument applies to the right virtual image.

Further, the virtual image generator 22B of the second modification projects virtual images on the windshield 11 in such a way that, when the left and right virtual images 21B, 21B are visually superimposed on the forward road 31 viewed from the passenger compartment 13 through the windshield 11, the left and right virtual images 21B, 21B are visually recognized to respectively follow the left and right driving lane lines 33, 33. The distance between the left and right lower virtual images 21Bd, 21Bd corresponds to the width of the vehicle 10. That is, the left and right virtual images 21B, 21B are arranged in such a way that the distance between the lower portions thereof is larger than that of the upper portions when viewed from the passenger compartment 13.

Moreover, the virtual image generator 22B of the second modification projects the virtual images 21B, 21B in at least one of the following projection modes: a first projection mode M21 and a second projection mode M22 (not shown). In the first projection mode M21, the virtual images 21B, 21B are projected in such a way that the lower portions thereof are bright and the brightness is gradually lowered from bottom to top. That is, in the first projection mode M21, the lower virtual image 21Bd is brightly projected, the intermediate virtual image 21Bm is slightly darker, and the upper virtual image 21Bu is dark. In the second projection mode M22, the virtual images 21B, 21B are projected in such a way that the lower portions thereof are heavily grayed and the grayscale gradually becomes lighter (paler) from bottom to top. That is, in the second projection mode M22, the lower virtual image 21Bd is heavily grayed, the intermediate virtual image 21Bm is slightly lightly grayed, and the upper virtual image 21Bu is lightly grayed.

As described above, the brightness or the grayscale of the virtual images 21B, 21B is graded from bottom to top. The virtual images 21B, 21B are displayed on the windshield 11 in such a way that the lower portions, which correspond to the nearer side in the traveling direction Fr of the vehicle 10, are bright and the brightness is gradually lowered from bottom to top, or the lower portions are heavily grayed and the grayscale gradually becomes lighter from bottom to top. For example, the lower virtual image 21Bd is displayed in bright white, the intermediate virtual image 21Bm is slightly darker white, and the upper virtual image 21Bu is displayed in dark white.

The driver Mn can visually recognize the lower virtual image 21Bd displayed in bright white more distinctly than a forward scene viewed from the passenger compartment 13 through the windshield 11. On the other hand, the intermediate virtual image 21Bm is less visible, and the upper virtual image 21Bu displayed in dark white is hardly visible (or not visible).

As described above, the left and right lower virtual images 21Bd, 21Bd, which are distinctly visible, are located in positions that correspond to the nearer side in the traveling direction Fr (advancing direction) of the vehicle 10 and given the highest priority of visibility to the driver Mn. On the other hand, the left and right upper virtual images 21Bu, 21Bu, which are hardly visible, are located in positions that correspond to the farther side in the traveling direction Fr of the vehicle 10 and given the lowest priority of visibility to the driver Mn. In this way, the driver Mn can feel the sense of distance in the traveling direction Fr of the vehicle 10. The driver Mn can therefore visually recognize the left and right virtual images 21B, 21B three-dimensionally. Since the sense of three-dimensionality and the sense of depth (the sense of distance) of the virtual images 21B, 21B are thus enhanced, the visibility of the virtual images is improved. As a result, the driver Mn is visually notified of information in a more appropriate, quicker manner.

The driver Mn can readily drive the vehicle 10 by maneuvering the vehicle 10 in such a way that the left and right virtual images 21B, 21B always follow the left and right driving lane lines 33, 33 visible from the passenger compartment 13 through the windshield 11. For example, when the driver Mn drives the vehicle 10 straight forward on a road, maneuvers the vehicle 10 through a narrow road, or pulls the vehicle 10 over to the curb, the driver Mn can readily drive the vehicle by using the left and right virtual images 21B, 21B as guidance.

An in-vehicle information display apparatus of a second embodiment will be described with reference to FIG. 8 and other drawings.

Figure 8:
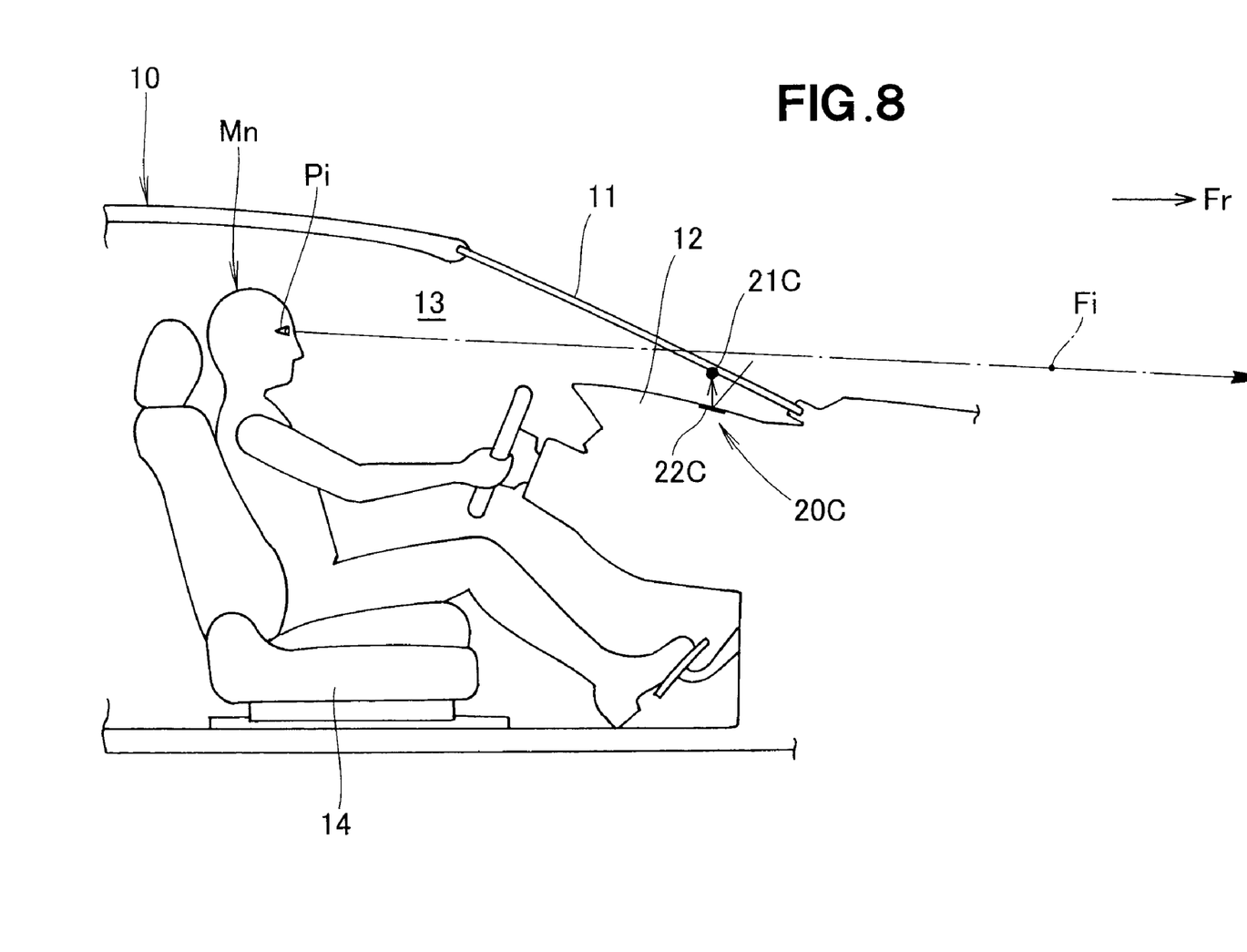
FIG. 8 is a schematic view of a vehicle employing an in-vehicle information display apparatus according to a second embodiment of the present invention.

As shown in FIG. 8, an in-vehicle information display apparatus 20C of the second embodiment notifies the driver Mn of displayed information by projecting a virtual image 21C containing a variety of types of information on the windshield 11 of the vehicle 10. The in-vehicle information display apparatus 20C includes a virtual image generator 22C.

The virtual image generator 22C can project a predetermined virtual image 21C on the windshield 11. The virtual image generator 22C is provided in a position where it does not block the sight of the driver Mn, for example, on an upper surface of the instrument panel 12 under the windshield 11. The virtual image generator 22C is comprised of, for example, a coating (including a film and a label) attached to the upper surface of the instrument panel 12 or directly formed by using painting, printing, plating, or other surface treatment techniques. The virtual image generator 22C has a pattern thereon that corresponds to the virtual image 21C. The virtual image 21C corresponds to the virtual image 21 shown in FIG. 4, the virtual image 21A shown in FIG. 5, or the virtual images 21B, 21B shown in FIG. 7. The virtual image 21C is projected in a lower portion of the windshield 11 when illumination light in the passenger compartment 13 or external light (natural light or illumination light outside the vehicle) is reflected off the pattern formed on the coating-like virtual image generator 22C.

The actions and effects of the in-vehicle information display apparatus 20C of the second embodiment are the same as those in the first embodiment and variations thereof described above, and no description of such actions and effects will be made. According to the in-vehicle information display apparatus 20C, only the coating-like virtual image generator 22C can project the virtual image 21C, whereby the configuration of the in-vehicle information display apparatus is simplified.

An in-vehicle information display apparatus of a third embodiment will be described with reference to FIGS. 9 and 10.

Figure 9:
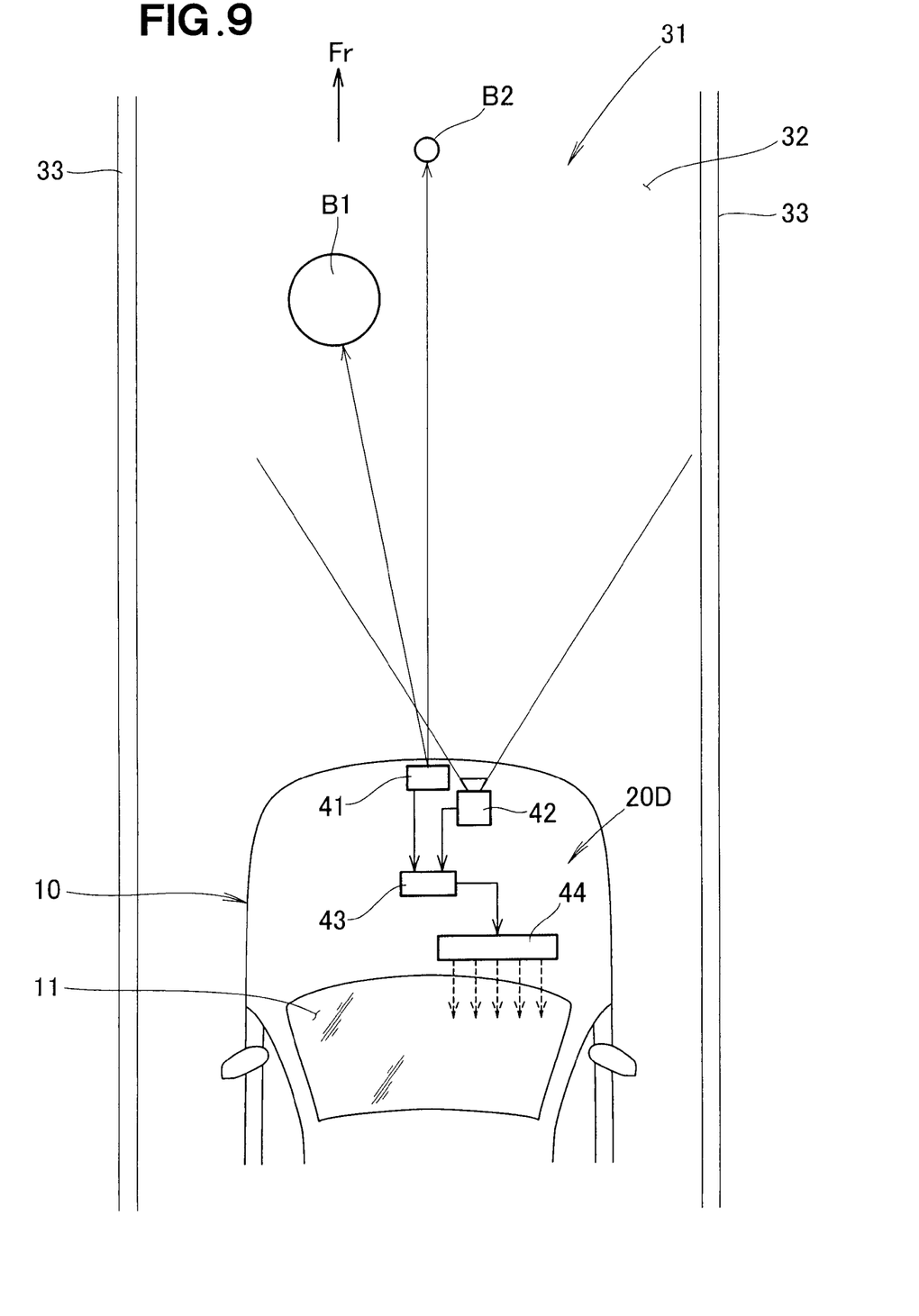
FIG. 9 is a schematic top plan view of a vehicle employing an in-vehicle information display apparatus according to a third embodiment of the present invention.
Figure 10:
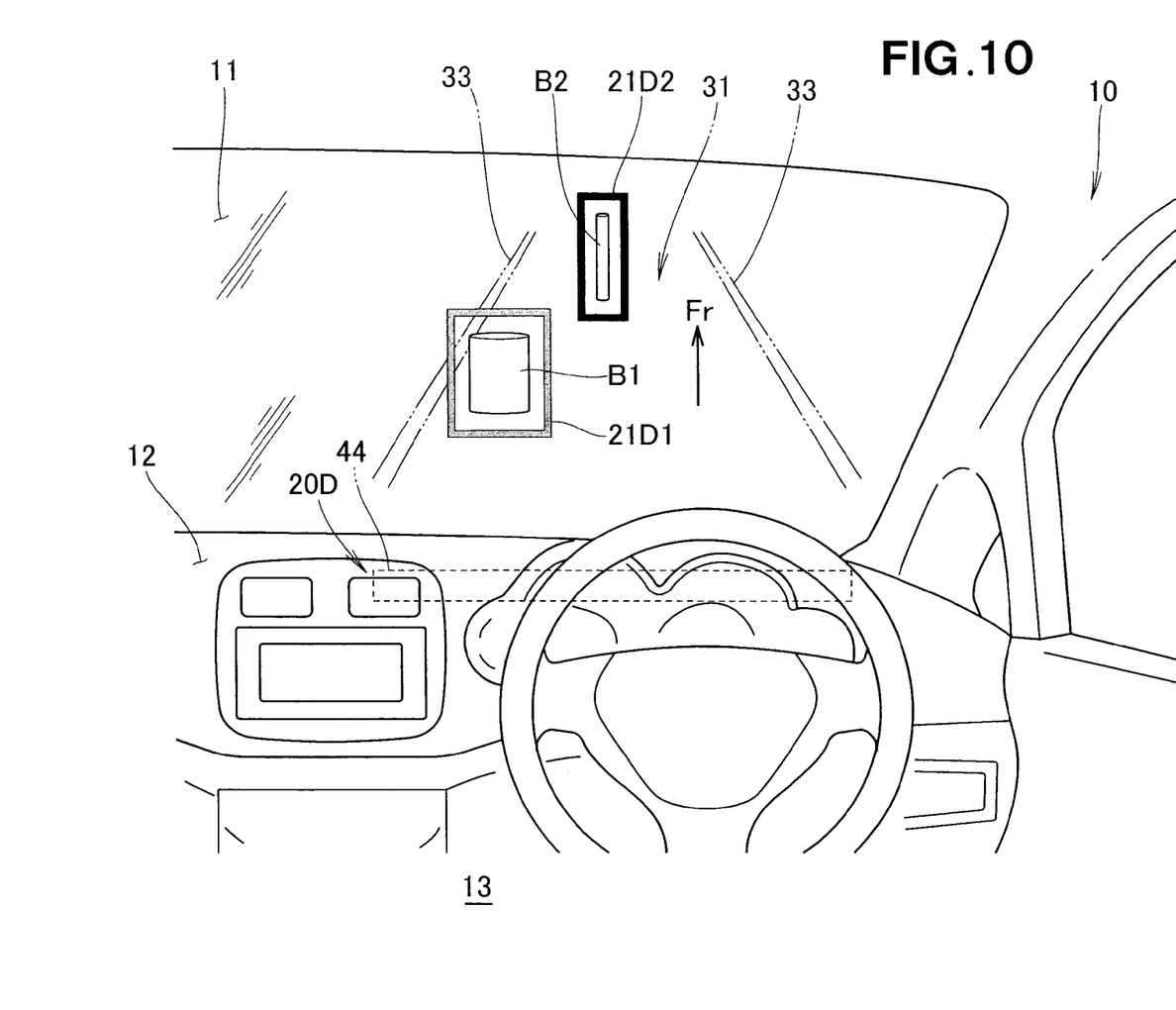
FIG. 10 shows a windshield of the vehicle of FIG. 9 as seen from a passenger compartment.

As shown in FIGS. 9 and 10, an in-vehicle information display apparatus 20D of the third embodiment notifies the driver Mn (see FIG. 1) of displayed information by projecting one or more virtual images (virtual images 21D1, 21D2, for example) containing a variety of types of information on the windshield 11 of the vehicle 10. The in-vehicle information display apparatus 20D includes an obstacle detector 41, an imager 42, a controller 43, and a virtual image generator 44.

The obstacle detector 41 is disposed in a front portion of the vehicle 10 and detects an obstacle (obstacles B1, B2, for example) in front of the vehicle Fr. The obstacle detector 41 includes a light emitter that emits laser light forward and a light receiver that receives reflected light. The obstacle detector 41 can detect the distance and direction from the vehicle 10 to each of the obstacles B1, B2 by using the light emitter to emit laser light over a predetermined illumination range and using the light receiver to receive the light reflected off the obstacles B1, B2.

The imager 42 is disposed in the front portion of the vehicle 10, captures a scene in front of the vehicle Fr (including the obstacles B1, B2), performs image processing on the captured image, and outputs the resultant image. The imager 42 comprises, for example, an infrared camera or a visible-light camera.

The controller 43 produces image pattern data based on the detection data received from the obstacle detector 41 and the captured image received from the imager 42, and sends the image pattern data to the virtual image generator 44.

The virtual image generator 44 can project predetermined virtual images 21D2, 21D2 on the windshield 11 based on the image pattern data received from the controller 43. The virtual image generator 44 is disposed in a position where it does not block the sight of the driver Mn, for example, in the instrument panel 12 under the windshield 11. Specifically, the virtual image generator 44 comprises, for example, a head-up display (HUD) and projects the virtual images 21D2, 21D2 in a lower portion of the windshield 11.

For example, consider a case where the obstacle detector 41 detects at least one of the first obstacle B1 and the second obstacle B2 present in front of the vehicle 10 (Fr). It is assumed that the distance from the vehicle 10 to the first obstacle B1 is shorter than the distance from the vehicle 10 to the second obstacle B2. The controller 43 determines the positions of the first and second obstacles B1, B2 based on the detection data (position data) received from the obstacle detector 41, and produces image pattern data including marks (identification marks) by which the positions of the obstacles are identified. The virtual image generator 44 projects the predetermined virtual images 21D1, 21D2 on the windshield 11 based on the image pattern data received from the controller 43.

As a result, the virtual images 21D1, 21D2 are projected on the windshield 11 and superimposed on a forward scene viewed from the passenger compartment 13 through the windshield 11. For example, the projected first virtual image 21D1 is a frame-shaped pattern that surrounds the first obstacle B1, and the projected second virtual image 21D2 is a frame-shaped pattern that surrounds the second obstacle B2.

The driver Mn (see FIG. 1) can not only drive the vehicle while looking at the forward scene from the passenger compartment 13 through the windshield 11, but also visually recognize the virtual images 21D1, 21D2 projected on the windshield 11.

The virtual image generator 44 projects the virtual images 21D1, 21D2 in at least one of the following projection modes: a first projection mode M31 and a second projection mode M32 (not shown).

The first obstacle B1 is positioned on the nearer side in the traveling direction Fr of the vehicle 10. The first virtual image 21D1 that surrounds the first obstacle B1 is therefore projected in a position on the windshield 11 that corresponds to the nearer side in the traveling direction Fr of the vehicle 10.

On the other hand, the second obstacle B2 is positioned on the farther side (farther away from the vehicle) in the traveling direction Fr of the vehicle 10. The second virtual image 21D2 that surrounds the second obstacle B2 is therefore projected in a position on the windshield 11 that corresponds to the farther side in the traveling direction Fr of the vehicle 10.

In the first projection mode M31, a virtual image (first virtual image 21D1, for example) in a position that corresponds to the nearer side in the traveling direction Fr of the vehicle 10 is projected as a bright image on the windshield 11, and a virtual image (second virtual image 21D2, for example) in a position farther away in the traveling direction Fr is projected as a darker image. In the second projection mode M32, a virtual image (first virtual image 21D1, for example) in a position that corresponds to the nearer side in the traveling direction Fr of the vehicle 10 is projected as a heavily grayed image on the windshield 11, and a virtual image (second virtual image 21D2, for example) in a position farther away in the traveling direction Fr is projected as a more lightly grayed image. As described above, the brightness or the grayscale of the virtual images 21D1, 21D2 is graded from the nearer side to the farther side in the traveling direction Fr of the vehicle 10.

The number of virtual images projected on the windshield 11 naturally corresponds to the number of obstacles detected by the obstacle detector 41. When the obstacle detector 41 detects no obstacle, no virtual image for identifying an obstacle is projected on the windshield 11. When the obstacle detector 41 detects only one of the first and second obstacles B1, B2, a virtual image (21D1 or 21D2) for identifying the detected one of the obstacles is projected on the windshield 11.

According to the in-vehicle information display apparatus 20D of the third embodiment, the driver Mn can visually recognize a virtual image (first virtual image 21D1, for example) in a position that corresponds to the nearer side in the traveling direction Fr of the vehicle 10 more distinctly than a forward scene viewed from the passenger compartment 13 through the windshield 11, and hardly recognize a virtual image (second virtual image 21D2, for example) on the farther side in the traveling direction Fr. The driver Mn can therefore visually recognize the virtual images 21D1, 21D2 three-dimensionally. Since the sense of three-dimensionality and the sense of depth (the sense of distance) of the virtual images 21D1, 21D2 are thus enhanced, the visibility of the virtual images is improved. As a result, the driver Mn is visually notified of information in a more appropriate, quicker manner.

In the invention, the virtual image generators 22, 22B, 44 are not limited to a head-up display (HUD), but may have any other configuration as long as any of the virtual images 21, 21A, 21B, 21D1, 21D2 can be projected on the windshield 11. For example, the virtual image generators 22, 22B, 44 can be configured to lift up from an upper portion of the instrument panel 12 or can be in a so-called "pop-up configuration."

The virtual image generators 22, 22B, 44 may be configured to project a combination of the virtual image 21 shown in FIG. 4 and the virtual image 21A shown in FIG. 5 on the windshield 11. Specifically, the virtual image generators 22, 22B, 44 may be configured to project the virtual images 21, 21A, 21B, 21D1, 21D2 on the windshield 11 in such a way that they gradually become darker (more lightly grayed) from bottom to top and gradually become darker (more lightly grayed) from an end in the width direction toward the center in the width direction.

Further, the virtual image generators 22, 22B, 44 may be configured to project a combination of the virtual image 21 shown in FIG. 4, the virtual image 21A shown in FIG. 5, the virtual image 21B shown in FIG. 7, and the virtual images 21D1, 21D2 shown in FIG. 10 on the windshield 11.

The shape, color, pattern, and gradation ranges of the brightness and grayscale of each of the virtual images 21, 21A, 21B, 21C, 21D1, 21D2 are arbitrarily set.

The information contained in the virtual images 21, 21A, 21B, 21C is not limited to information on the vehicle width, but includes a variety of types of information, such as the vehicle speed.

The in-vehicle visual recognition assistance apparatus 20, 20B, 20C, 20D of the invention are suitably used in an automobile of sedan-type, wagon-type, and other types.

Obviously, various minor changes and modifications of the present invention are possible in light of the above teaching. It is therefore to be understood that within the scope of the appended claims the invention may be practiced otherwise than as specifically described.

What is claimed is:

1. An in-vehicle information display apparatus comprising:
   a virtual image generator that projects a virtual image on a windshield of a vehicle in such a way that the virtual image is projected on a forward road surface separated by a predetermined distance from a view point position of a driver who is driving the vehicle,
   wherein the virtual image generator projects the virtual image in at least one of the following projection modes:
   a first projection mode in which the virtual image is projected in such a way that a lower portion thereof is bright and the brightness is gradually lowered from the lower portion to an upper portion; and
   a second projection mode in which the virtual image is projected in such a way that the lower portion is heavily grayed and the grayscale gradually becomes lighter from the lower portion to the upper portion.

2. The display apparatus of claim 1, wherein the projected virtual image is visually recognized to have a projected width that is equivalent to a width of the vehicle.

3. The display apparatus of claim 1, wherein projected ends of the virtual image are visually recognized to be substantially parallel to driving lane lines of the road.

4. An in-vehicle information display apparatus comprising:
   a virtual image generator that projects a virtual image on a windshield of a vehicle in such a way that the virtual image is projected on a forward road surface separated by a predetermined distance from a view point position of a driver who is driving the vehicle,
   wherein the virtual image generator projects the virtual image in at least one of the following projection modes:
   a first projection mode in which the virtual image is projected in such a way that widthwise ends of the virtual image are bright and the brightness gradually decreases from each of the widthwise ends toward a widthwise central portion; and
   a second projection mode in which the virtual image is projected in such a way that the widthwise ends are heavily grayed and the grayscale gradually becomes lighter from each of the widthwise ends toward the widthwise central portion.

5. The display apparatus of claim 4, wherein the projected virtual image is visually recognized to have a projected width that is equivalent to the width of the vehicle.

6. The display apparatus of claim 4, wherein projected ends of the virtual image are visually recognized to be substantially parallel to driving lane lines of the road.

7. An in-vehicle information display apparatus comprising:
   a virtual image generator that projects one or more virtual images on a windshield of a vehicle,
   wherein the virtual image generator projects the virtual images in at least one of the following projection modes:
   a first projection mode in which a virtual image in a position that corresponds to the nearer side in the traveling direction of the vehicle is projected as a bright image on the windshield, and a virtual image in a position farther away in the traveling direction is projected as a darker image, and
   a second projection mode in which a virtual image in a position that corresponds to the nearer side in the traveling direction of the vehicle is projected as a heavily grayed image on the windshield, and a virtual image in a position farther away in the traveling direction is projected as a lightly grayed image.

\* \* \* \* \*